United States Patent [19]

Tröster

[11] 4,242,139
[45] Dec. 30, 1980

[54] WATER SOLUBLE BENZOXANTHENE DYESTUFFS FOR FLUORESCENT INKS

[75] Inventor: Helmut Tröster, Königstein, Fed. Rep. of Germany

[73] Assignee: Hoechst Aktiengesellschaft, Frankfurt am Main, Fed. Rep. of Germany

[21] Appl. No.: 8,484

[22] Filed: Feb. 1, 1979

[30] Foreign Application Priority Data

Feb. 3, 1978 [DE] Fed. Rep. of Germany ....... 2804530

[51] Int. Cl.³ .................................... C09D 11/00
[52] U.S. Cl. .................................. 106/22; 260/340.3; 260/DIG. 38; 546/47
[58] Field of Search ........................................... 106/22

[56] References Cited

U.S. PATENT DOCUMENTS

| | | | |
|---|---|---|---|
| 3,759,953 | 9/1973 | Tröster | 546/47 |
| 3,812,051 | 5/1974 | Merkle et al. | 546/47 |
| 3,888,862 | 6/1975 | Meininger | 546/47 |
| 3,888,863 | 6/1975 | Tröster | 546/47 |

*Primary Examiner*—Edward M. Woodberry
*Attorney, Agent, or Firm*—Curtis, Morris & Safford

[57] ABSTRACT

Water-soluble dyestuffs of the formula

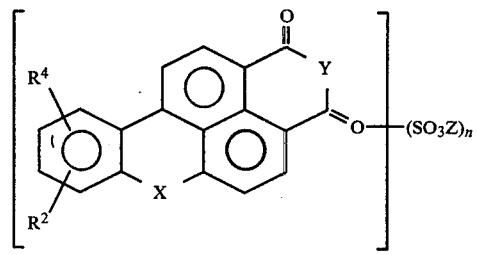

in which Y is oxygen or an imino group, $R^1$ and $R^2$ are hydrogen, halogen or lower alkyl or lower alkoxy, n is 1 to 3 and Z is a cation, are useful for fluorescent inks.

30 Claims, No Drawings

WATER SOLUBLE BENZOXANTHENE DYESTUFFS FOR FLUORESCENT INKS

Writing liquids containing fluorescent dyestuffs have found wide-spread use for any kind of labelling. As compared to non-fluorescent inks, they are much more conspiciuous because of their high degree of luminosity. Therefore, they are used for example for labelling important written documents or for optically accentuating certain passages of a text or details of drawings.

The fluorescent dyestuffs used in the past for this field of application, such as Rhodamine B, C.I. Basic Violet 10 (C.I.No. 45 170), C.I. Acid Yellow 7 (C.I. No. 56 205), hydroxypyrene-trisulfonic acid (Pyranine, C.I. Solvent Green 7, C.I. No. 59 040). or C.I. Basic Yellow 40, although displaying in general satisfactory fluorescing intensity, have the disadvantage of not being sufficiently stable to light. Thus, in the case of yellow labelling inks, the luminescence of the colored markings produced with their use was often lost even after a few days' exposure to normal daylight by brown discoloration or fading. In order to compensate this drawback, it has been proposed in German Offenlegungsschrift No. 2,441,823 to add reducing agents to such daylight-luminous dyes, especially on the basis of hydroxypyrene-trisulfonic acid (the use of such dyestuffs in labelling liquids has been described in German Pat. No. 2,315,680). However, this addition does not really improve the stability to light, because the stabilizing effect of the reducing agent is lost again by air oxidation.

It has now been found that water-soluble benzoxanthene dyestuffs of the formula I

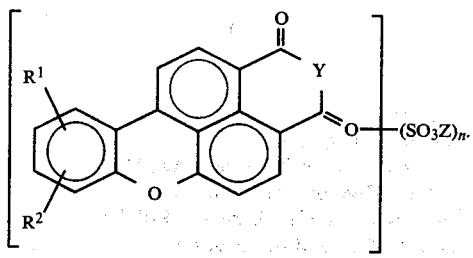

in which Y is an oxygen atom or a N—R group where R represents a hydrogen atom or an optionally substituted alkyl, cycloalkyl, carbocyclic or heterocyclic aryl radical, an optionally substituted alkoxy, acyloxy, alkylamino or acylamino group, $R^1$ and $R^2$, being identical or different, each are a hydrogen or halogen atom, preferably a chlorine or bromine atom, or a lower alkyl or alkoxy group each having from 1 to 5 carbon atoms, n is a number of from 1 to 3, and Z is a hydrogen atom, an alkali metal atom or, preferably, an ammonium cation of the formula II

in which $R^3$, $R_4$ and $R_5$, being identical or different, each are a hydrogen atom or an optionally substituted alkyl radical, or $R^3$ and $R^4$ together with the nitrogen atom form a heterocyclic ring, for example a morpholine, piperidine or piperazine ring, are very suitable as water-soluble yellow fluorescent dyestuffs for labelling inks. In the case where R represents substituted groups, suitable radicals are those which do not adversely affect the fluorescence, for example hydroxy, lower alkyl, lower alkoxy, carboxy or sulfo groups; these radicals for their part optionally carrying further substituents, for example an alkoxy group substituted by a further alkoxy group. By "acyl", there is to be understood preferably lower alkanoyl or benzoyl: "aryl" represents preferably phenyl, and "cyclo-alkyl" is preferably cyclohexyl. Preferred aliphatic radicals are those having up to 5 carbon atoms. One of the radicals $R^3$, $R^4$ and $R^5$ at least is preferably other than hydrogen.

Subject of the invention are furthermore fluorescent inks containing a dyestuff of the formula I. In the most simple case, such dyestuff inks are aqueous solutions of the corresponding dyestuffs (Ullmanns Encyklopädie der technischen Chemie, 3rd ed., vol. 15, 351–352). In principle, the dyestuff can also be dissolved in an organic solvent. However, such inks are generally less preferred because when using them on paper, they penetrate too deeply into the substrate, which not only deteriorates the luminous effect on the surface of the paper sheet, but may cause blots of the labelling liquid even on the back of the paper.

Therefore, the inks contain preferably up to about 40, especially up to about 35 weight % of water-miscible organic solvents, in particular glycerol or glycols such as ethylenediglycol, or glycol ethers such as ethyleneglycol-mono-ethyl ether, which simultaneously keep the ink moist and delay its drying up.

In order to improve the writing properties, the inks may contain further additives to produce a suitable viscosity. Such viscosity regulators are for example natural gums such as gum arabic, polyglycol ethers deriving from alkylphenols or fatty alcohols, or waxlike substances such as polyethyleneglycol waves.

The cited viscosity regulators and/or drying inhibitors may be present in the ink in an amount of up to about 10, preferably up to 5, and especially up to 1, weight %.

Preferably, the inks consist substantially of from 0.5 to 5, preferably 1 to 3, especially 1.5 to 2, weight % of a dyestuff of the formula I, from 0 to 99.5, preferably 60 to 99, especially 65 to 99, weight % of water, up to 99.5, preferably up to 39, especially up to 33.5, weight % of water-miscible organic solvents, and up to 10, preferably up to 5, especially up to 1, weight % or viscosity regulators and/or drying inhibitors.

In many cases, preserving agents such as phenol, salicyclic acid or chlorophenols are added to the inks in amounts of up to 1, preferably up to 0.1, weight %.

The dyestuffs to be used in accordance with this invention are superior to the yellow fluorescent dyestuffs hitherto used for this application with respect to light stability. Furthermore, as compared to the labelling liquids described in the above German Offenlegungsschrift and German Patent, respectively, which require adjustment of the pH in the alkaline range (above 8.5) in order to obtain the intended fluorescent shade, they have the advantage of not requiring any additives.

The dyestuff sulfonic acids and their salts to be used in accordance with this invention are described in German Pat. Nos. 2.017,764 and 2,150,879. The ammonium salts can be obtained in known manner by neutralizing the dyestuff sulfonic acids with equivalent amounts of the corresponding amine in water or inert organic solvents such as alcohols, and isolating the color salt as usual by filtration or distillation of the solvent or diluent.

The following Examples illustrate the invention, indicating some formulations on the basis of the dyestuffs to be used in accordance with the invention.

EXAMPLE 1

Solution of
1.5 g of the dyestuff of the formula

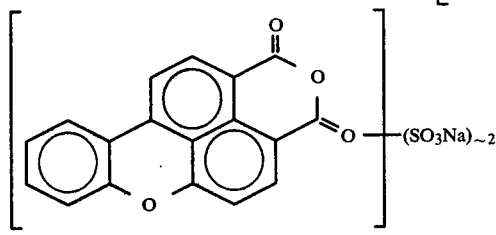

in
20 g of diethylene glycol and 78.5 g of water.

EXAMPLE 2

Solution of
2.0 g of the dyestuff of the formula

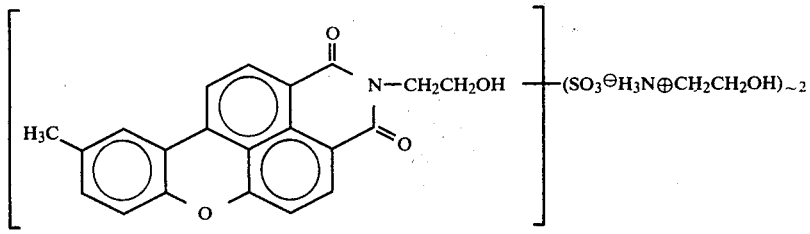

in
15 g of glycol
0.5 of nonylphenol, oxethylated with 23 mols of ethylene oxide and
82.5 g of water.

EXAMPLE 3

Solution of 2.0 g of the dyestuff of the formula

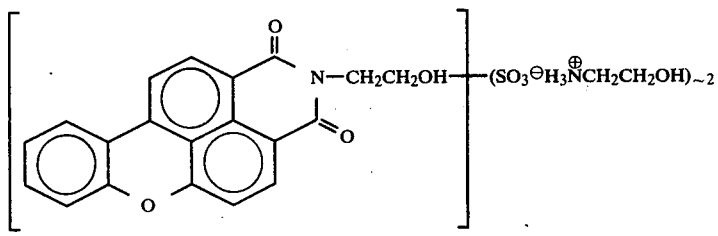

In
70 g of water
27 g of diethylene-glycol,
0.8 g of polyvinylpyrrolidone and 0.2 g of nonylphenyl, oxethylated with 6 mols of ethylene oxide.

In the following Table, there are listed further dyestuffs which can be used in accordance with the invention; the aqueous formulations thereof prepared according to the above Examples give brilliant greenish-to reddish-yellow color markings having a good stability to light.

| Example | n | $R^1$ | $R^2$ | Y | Z |
|---------|---|----|----|---|---|
| 4 | ~2 | H | H | >O/ | H₂N–morpholine |
| 5 | ~2 | H | H | >O/ | $HN(C_2H_5)_3$ |

-continued

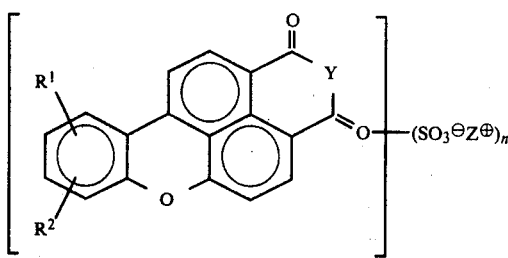

| Example | n | R¹ | R² | Y | Z |
|---|---|---|---|---|---|
| 6 | ~2 | H | H | $\diagdown$N—CH$_2$CH$_2$CH$_2$OCH$_3$ | H |
| 7 | ~2 | 10-CH$_3$ | 9-CH$_3$ | $\diagdown$N—(C$_6$H$_4$)—COOH (meta) | H |
| 8 | ~1.2 | H | 9-CH$_3$ | $\diagdown$N—(2,4-diCH$_3$-C$_6$H$_3$) | Na |
| 9 | ~2 | H | H | $\diagdown$NCH$_2$CH$_2$OH | K |
| 10 | ~2 | 10-OCH$_3$ | H | $\diagdown$N—(2,4-diCH$_3$-C$_6$H$_3$) | Na |
| 11 | ~2 | H | H | $\diagdown$N—(CH$_2$)$_3$O(CH$_2$)$_2$OC$_2$H$_5$ | H$_3$N(CH$_2$)$_3$O(CH$_2$)$_2$OC$_2$H$_5$ |
| 12 | ~1.5 | H | 9-Cl | $\diagdown$N—CH$_3$ | H$_3$NCH$_2$CH$_2$OH |
| 13 | ~2 | 10-Br | H | $\diagdown$N—(CH$_2$)$_3$OCH$_3$ | H$_3$N(CH$_2$)$_3$OCH$_3$ |
| 14 | ~2 | 10-Cl | 9-CH$_3$ | $\diagdown$NCH$_2$CH$_2$OH | Na |
| 15 | ~2 | H | H | $\diagdown$N(CH$_2$)$_3$(OCH$_2$CH$_2$)$_3$OCH$_3$ | H$_3$N(CH$_2$)$_3$(OCH$_2$CH$_2$)$_3$OCH$_3$ |
| 16 | ~2 | 10-CH$_3$ | H | $\diagdown$NCH$_2$CH$_2$CH$_2$OH | H$_3$NCH$_2$CH$_2$CH$_2$OH |
| 17 | ~2 | H | H | $\diagdown$N—(C$_6$H$_4$)—SO$_3$Na | Na |
| 18 | ~2 | H | H | $\diagdown$N—(C$_6$H$_4$)—SO$_3^\ominus$H$_3$N$^\oplus$CH$_2$CH$_2$OH | H$_3$NCH$_2$CH$_2$OH |

-continued

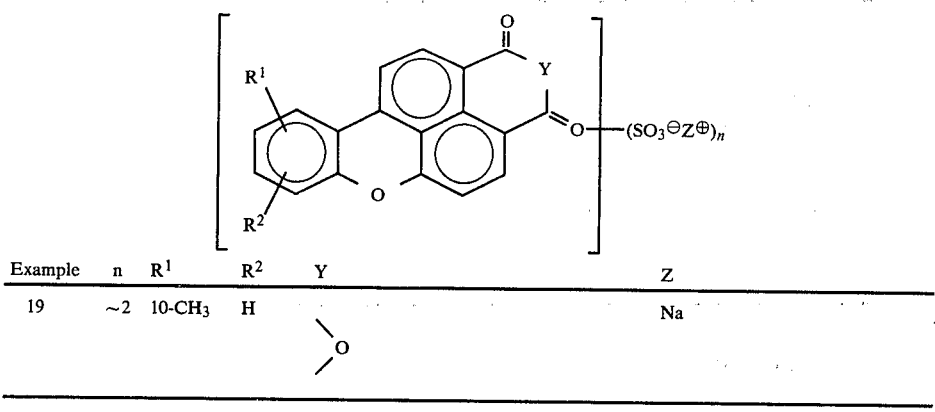

| Example | n | R¹ | R² | Y | Z |
|---|---|---|---|---|---|
| 19 | ~2 | 10-CH₃ | H | 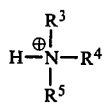 | Na |

20

What is claimed is:

1. A fluorescent ink consisting of a liquid containing dissolved therein an effective amount of a dyestuff of the formula

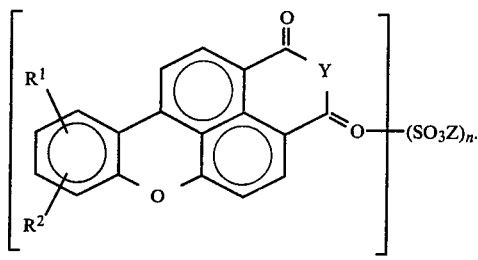   I wherein Y is oxygen or a group of the formula

>N—R in which R is hydrogen, unsubstituted or substituted alkyl of 1 to 5 carbon atoms, unsubstituted or substituted cyclohexyl, unsubstituted or substituted phenyl, unsubstituted or substituted alkoxy of 1 to 5 carbon atoms, alkanoyloxy of 1 to 5 carbon atoms, benzoyloxy, alkylamino of 2 to 5 carbon atoms, alkanoylamino of 1 to 5 carbon atoms or benzoylamino, R¹ and R² which are the same or different, are hydrogen, halogen, alkyl of 1 to 4 carbon atoms or alkoxy of 1 to 4 carbon atoms, n is a number of 1 to 3, Z is an alkali metal or an ammonium cation of the formula

wherein R³, R⁴ and R⁵ which are the same or different, are hydrogen, unsubstituted or substituted alkyl of 1 to 5 carbon atoms or R⁴ and R⁵ together with the nitrogen atom stand for piperidine, morpholine or piperazine.

2. An ink as claimed in claim 1, wherein the substituents on said alkyl, cyclohexyl, phenyl or alkoxy groups being R are hydroxy, alkyl of 1 to 5 carbon atoms, alkoxy of 1 to 5 carbon atoms, carboxy or sulfo.

3. An ink as claimed in claim 26, wherein at least one of the groups R³, R⁴ and R⁵ is different from hydrogen.

4. An ink as claimed in claim 1, wherein Z is sodium, potassium, mono-, di- or tri-(alkyl)ammonium having 1 or 2 carbon atoms in each alkyl moiety, mono-, di- or tri-(alkanol)-ammonium having 2 or 3 carbon atoms in each alkanol moiety, or mono-alkyl-ammonium of 2 or 3 carbon atoms being substituted by a mono-, di- or tri-alkylene-glycol ether group having 2 or 3 carbon atoms in the alkylene moieties and 1 or 2 carbon atoms in the terminal ether group.

5. An ink as claimed in claim 1, wherein the dyestuff has the formula

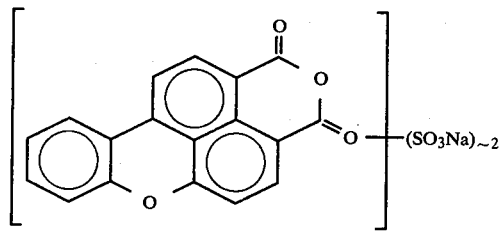

6. An ink as claimed in claim 1, wherein the dyestuff has the formula

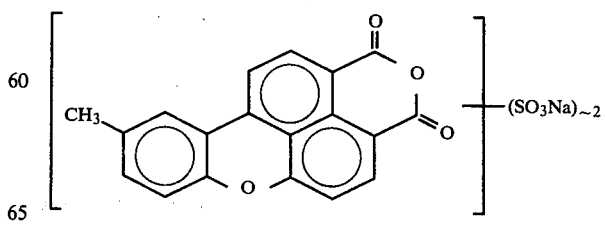

7. An ink as claimed in claim 1, wherein the dyestuff has the formula

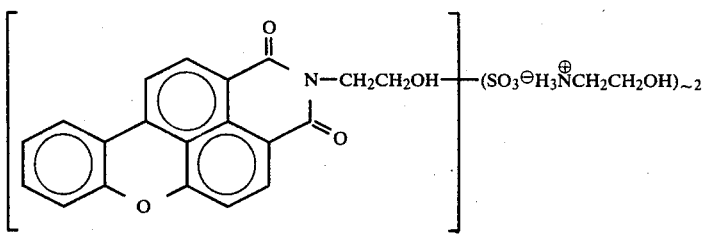

8. An ink as claimed in claim 1, wherein the dyestuff has the formula

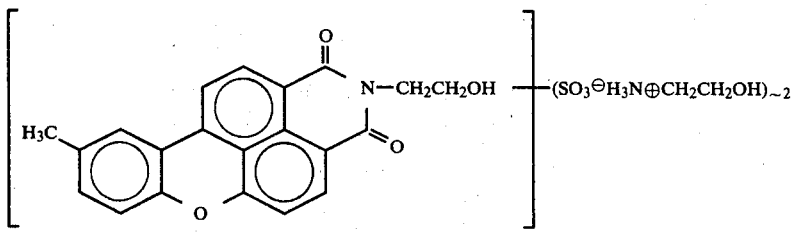

9. An ink as claimed in claim 1, containing 0.5 to 5% by weight of said dyestuff.
10. An ink as claimed in claim 1, containing 1 to 3% by weight of said dyestuff.
11. An ink as claimed in claim 1, containing 1.5 to 2% by weight of said dyestuff.
12. An ink as claimed in claim 1, wherein the dyestuff is dissolved in water.
13. An ink as claimed in claim 1, which contains a water-miscible organic solvent.
14. An ink as claimed in claim 13, containing up to about 40% by weight of solvent.
15. An ink as claimed in claim 13, containing up to about 35% by weight of solvent.
16. An ink as claimed in claim 1, containing an effective amount of a viscosity-regulating agent or an agent preventing the drying or both.
17. An ink as claimed in claim 16, containing up to 10% by weight of said agent or agents.
18. An ink as claimed in claim 17, wherein the content is up to 5% by weight.
19. An ink as claimed in claim 17, wherein the content is up to 1% by weight.
20. An ink as claimed in claim 1, containing an effective amount of a preservative.
21. An ink as claimed in claim 20, containing up to 1% by weight of preservative.
22. An ink as claimed in claim 20, containing up to 0.1% by weight of preservative.
23. An ink as claimed in claim 1, consisting essentially of
  0.5 to 5% by weight of said dyestuff,
  uo to 99.5% by weight of water
  up to 99.5% by weight of water-miscible organic solvent
  up to 10% by weight of viscosity-regulating agent and/or agent preventing the drying, and
  up to 1% by weight of preservative.
24. An ink as claimed in claim 23, consisting essentially of
  1 to 3% by weight of said dyestuff,
  60 to 99% by weight of water,
  up to 39% by weight of said solvent,
  up to 5% by weight of said agents and
  up to 0.1% by weight of preservative.

25. An ink as claimed in claim 23, consisting essentially of
  1.5 to 2% by weight of said dyestuff,
  65 to 98.5% by weight of water, up to 33.5% by weight of said solvent, up to 1% by weight of said agents and up to 0.1% by weight of preservative.
26. A fluorescent ink consisting of a liquid containing dissolved therein an effective amount of a dyestuff of the formula

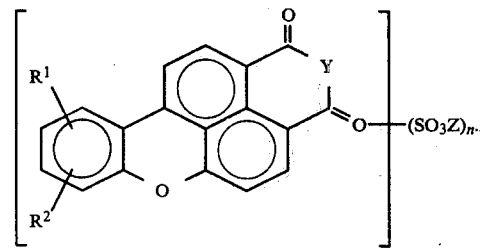

wherein Y is oxygen or a group of the formula

>N—R in which R is hydrogen, unsubstituted or substituted alkyl of 1 to 5 carbon atoms, unsubstituted or substituted cyclohexyl, unsubstituted or substituted phenyl, unsubstituted or substituted alkoxy of 1 to 5 carbon atoms, alkanoyloxy of 1 to 5 carbon atoms, benzoyloxy, alkylamino of 2 to 5 carbon atoms, alkanoylamino of 1 to 5 carbon atoms or benzoylamino,
  $R^1$ and $R^2$ which are the same or different, are hydrogen, halogen, alkyl of 1 to 4 carbon atoms or alkoxy of 1 to 4 carbon atoms,
  n is a number of 1 to 3,
  Z is an ammonium cation of the formula

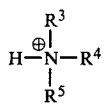

wherein $R^3$, $R^4$ and $R^5$, which are the same or different, are hydrogen, unsubstituted or substituted alkyl of 1 to 5 carbon atoms or $R^4$ and $R^5$ together with the nitrogen atom stand for piperdine, morpholine or piperazine.

27. A method of formulating a fluorescent ink which comprises dissolving a dyestuff in a liquid, the dyestuff having the formula

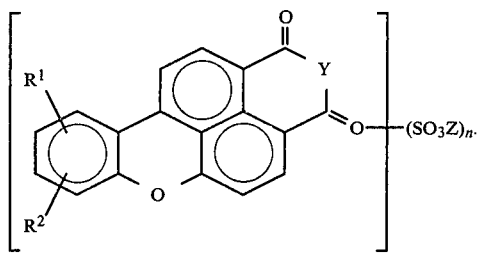    I wherein Y is oxygen or a group of the formula

in which R is hydrogen, unsubstituted or substituted alkyl of 1 to 5 carbon atoms, unsubstituted or substituted cyclohexyl, unsubstituted or substituted phenyl, unsubstituted or substituted alkoxy of 1 to 5 carbon atoms, alkanoyloxy of 1 to 5 carbon atoms, benzoyloxy, alkylamino of 2 to 5 carbon atoms, alkanoylamino of 1 to 5 carbon atoms or benzoylamino, $R^1$ and $R^2$ which are the same or different, are hydrogen, halogen, alkyl of 1 to 4 carbon atoms or alkoxy of 1 to 4 carbon atoms, n is a number of 1 to 3, Z is an alkali metal or an ammonium cation of the formula

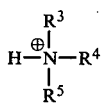

wherein $R^3$, $R^4$ and $R^5$ which are the same or different, are hydrogen, unsubstituted or substituted alkyl of 1 to 5 carbon atoms or $R^4$ and $R^5$ together with the nitrogen atom stand for piperidine, morpholine or piperazine.

28. The method of using a composition as a fluorescent ink on a substrate which comprises forming the composition by dissolving a compound in a liquid, the compound having the formula

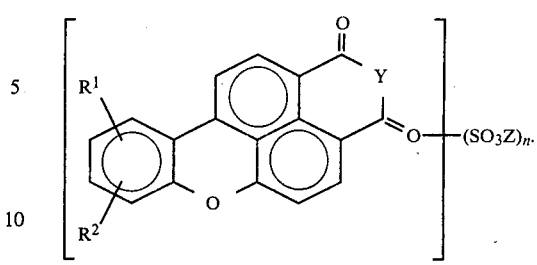    I wherein Y is oxygen or a group of the formula

in which R is hydrogen, unsubstituted or substituted alkyl of 1 to 5 carbon atoms, unsubstituted or substituted cyclohexyl, unsubstituted or substituted phenyl, unsubstituted or substituted alkoxy of 1 to 5 carbon atoms, alkanoyloxy of 1 to 5 carbon atoms, benzoyloxy, alkylamino of 2 to 5 carbon atoms, alkanoylamino of 1 to 5 carbon atoms or benzoylamino, $R^1$ and $R^2$ which are the same or different, are hydrogen, halogen, alkyl of 1 to 4 carbon atoms or alkoxy of 1 to 4 carbon atoms, n is a number of 1 to 3, Z is an alkali metal or an ammonium cation of the formula

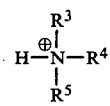

wherein $R^3$, $R^4$ and $R^5$ which are the same or different, are hydrogen, unsubstituted or substituted alkyl of 1 to 5 carbon atoms or $R^4$ and $R^5$ together with the nitrogen atom stand for piperidine, morpholine or piperazine, and then applying the composition to the substrate.

29. Method of inking a substrate which comprises applying to the substrate a composition including a liquid in which is dissolved a compound of the formula

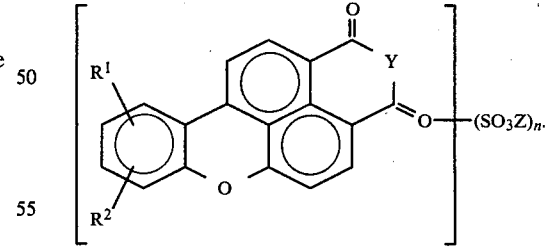    I wherein Y is oxygen or a group of the formula

in which R is hydrogen, unsubstituted or substituted alkyl of 1 to 5 carbon atoms, unsubstituted or substituted cyclohexyl, unsubstituted or substituted phenyl, unsubstituted or substituted alkoxy of 1 to 5 carbon atoms, alkanoyloxy of 1 to 5 carbon atoms, benzoyloxy, alkylamino of 2 to 5 carbon atoms, alkanoylamino of 1 to 5 carbon atoms or benzoylamino, R¹ and R² which are the same or different, are hydrogen, halogen, alkyl of 1 to 4 carbon atoms or alkoxy of 1 to 4 carbon atoms, n is a number of 1 to 3, Z is an alkali metal or an ammonium cation of the formula

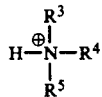

wherein R³, R⁴ and R⁵ which are the same or different, are hydrogen, unsubstituted or substituted alkyl of 1 to 5 carbon atoms or R⁴ and R⁵ together with the nitrogen atom stand for piperidine, morpholine or piperazine.

30. The method as claimed in claims 27, 28 or 29 wherein Z is an ammonium cation of the formula

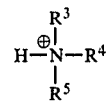

wherein R³, R⁴ and R⁵, which are the same or different, are hydrogen, unsubstituted or substituted alkyl of 1 to 5 carbon atoms or R⁴ and R⁵ together with the nitrogen atom stand for piperdine, morpholine or piperazine.

* * * * *